(12) United States Patent
Grimm et al.

(10) Patent No.: US 11,772,901 B2
(45) Date of Patent: Oct. 3, 2023

(54) CONVEYOR STOCKPILE DESEGREGATION SYSTEMS, METHODS AND APPARATUS

(71) Applicant: SUPERIOR INDUSTRIES, INC., Morris, MN (US)

(72) Inventors: Lafe Grimm, Morris, MN (US); Troy Plattner, Congerville, IL (US)

(73) Assignee: Superior Industries, Inc., Morris, MN (US)

( * ) Notice: Subject to any disclaimer, the term of this patent is extended or adjusted under 35 U.S.C. 154(b) by 115 days.

(21) Appl. No.: 17/446,494

(22) Filed: Aug. 31, 2021

(65) Prior Publication Data
US 2022/0081220 A1    Mar. 17, 2022

Related U.S. Application Data

(60) Provisional application No. 63/077,248, filed on Sep. 11, 2020.

(51) Int. Cl.
*B65G 43/08* (2006.01)
*B65G 65/28* (2006.01)
*B65G 41/00* (2006.01)

(52) U.S. Cl.
CPC ........... *B65G 43/08* (2013.01); *B65G 41/002* (2013.01); *B65G 41/008* (2013.01); *B65G 65/28* (2013.01); *B65G 2203/0283* (2013.01); *B65G 2203/0291* (2013.01); *B65G 2203/042* (2013.01); *B65G 2811/095* (2013.01)

(58) Field of Classification Search
CPC .... B65G 43/08; B65G 41/002; B65G 41/008; B65G 65/28; B65G 2203/0283; B65G 2203/0291; B65G 2203/042; B65G 2811/095

USPC .................................................. 198/508, 301
See application file for complete search history.

(56) References Cited

U.S. PATENT DOCUMENTS

| | | | | |
|---|---|---|---|---|
| 4,135,614 A | * | 1/1979 | Penterman | B65G 41/008 198/306 |
| 4,520,918 A | | 6/1985 | Ray | |
| 5,642,961 A | | 7/1997 | Campbell | |
| 6,360,876 B1 | * | 3/2002 | Nohl | B65G 41/008 198/588 |
| 9,731,905 B2 | * | 8/2017 | Enge | B65G 43/00 |
| 11,319,170 B2 | * | 5/2022 | Forker | B65G 65/28 |

(Continued)

FOREIGN PATENT DOCUMENTS

| | | | | |
|---|---|---|---|---|
| CN | 107458812 A | * | 12/2017 | ............. B65G 21/12 |
| CN | 109504852 A | | 3/2019 | |

(Continued)

OTHER PUBLICATIONS

Jerry Nohl, P.E. and Bob Domnick, "Technical Paper T-551 Stockpile Segregation," Superior Industries, 2000, 23 pages.

(Continued)

*Primary Examiner* — James R Bidwell
(74) *Attorney, Agent, or Firm* — Todd R. Fronek; Larkin Hoffman Daly & Lindgren, Ltd.

(57) ABSTRACT

Systems, methods and apparatus are provided for creating an at least partially desegregated stockpile. In some embodiments the stockpile comprises one or more windrows. In some embodiments an operating speed (e.g., belt speed) of the conveyor is varied to create windrows at various distances from the conveyor.

18 Claims, 6 Drawing Sheets

(56) References Cited

U.S. PATENT DOCUMENTS

2003/0136632 A1* 7/2003 Bernard .............. B65G 41/008
  198/300
2016/0355351 A1* 12/2016 Enge ..................... B65G 43/00
2017/0043962 A1* 2/2017 Nelson ................ B65G 41/008
2019/0346355 A1 11/2019 Lundin et al.

FOREIGN PATENT DOCUMENTS

| CN | 110846981 A | 2/2020 | |
|---|---|---|---|
| CN | 115535656 A | 12/2022 | |
| EP | 011001 A1 * | 5/1980 | ............. B65G 69/10 |
| JP | H03243703 A | 10/1991 | |

OTHER PUBLICATIONS

Superior Industries; PilePro Marketing Video Titled "TeleStacker® Conveyor PilePro™ Automation Zoning Method," Aug. 22, 2018[retrieved on May 10, 2023], retrieved from URL <https://www.youtube.com/watch?v=9aBBAsxge7M>, 2 pages.

Shi Zhao, 3"D Real-Time Stockpile Mapping and Modelling with Accurate Quality Calculation using Voxels," School of Mechanical Engineering University of Adelaide, Robotics Research Group, Feb. 2016, 175 pages.

* cited by examiner

CONVEYOR STOCKPILE DESEGREGATION SYSTEMS, METHODS AND APPARATUS

BACKGROUND

Conveyors are used to transfer aggregate material, e.g., to storage locations such as in stockpiles.

DESCRIPTION

Figure 1:
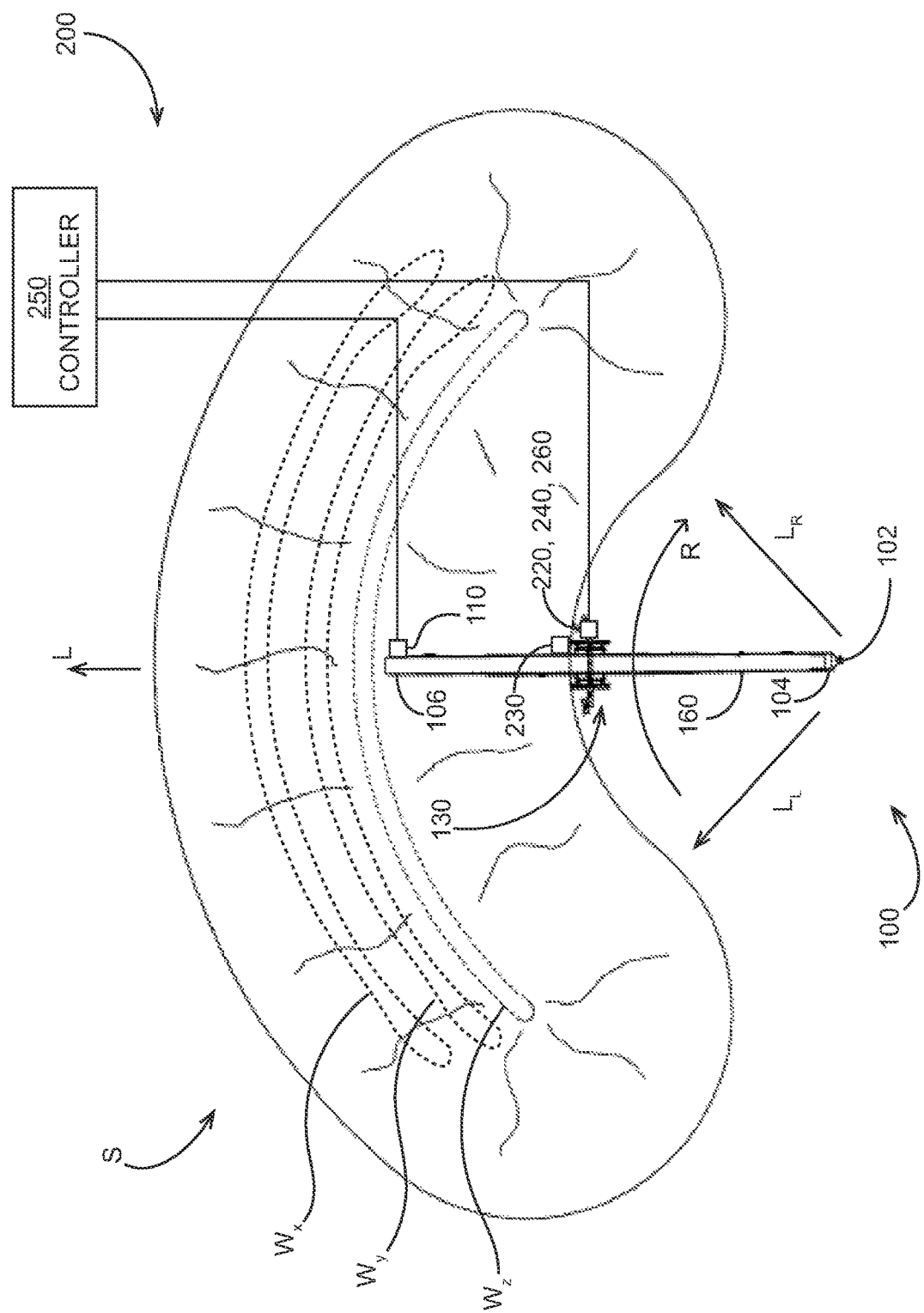
FIG. 1 is a top view of an embodiment of a stacking conveyor and schematically illustrates an embodiment of a conveyor control system.

Referring to the drawings, wherein like reference numerals designate identical or corresponding parts throughout the several views, FIG. 1 illustrates a radial stacking conveyor 100 unloading aggregate material to form a radial stockpile S at least partially comprised of a plurality of windrows W (e.g., $W_X$, $W_Y$, $W_Z$). It should be appreciated that the creation of stockpiles including a plurality of windrows tends to create at least partial desegregation of material size in the stockpile because each windrow tends to include a distribution of material size.

The conveyor 100 optionally includes a truss 160 which in some embodiments is a fixed-length truss (e.g., optionally does not include an extending or "stinger" truss). The truss 160 is optionally pivotally supported on a pivot 102 such that the truss is pivotable back and forth about pivot 102 along a radial direction R. A radial travel wheel assembly 130 optionally rollingly supports the truss 160 during radial travel. The truss 160 optionally supports a tail pulley 104 and a head pulley 106 (e.g., a driven head pulley). A drive 110 (e.g., electric motor) which may be referred to as a pulley drive is optionally operably coupled to the head pulley 106 to drive rotation of the head pulley.

Figure 2:
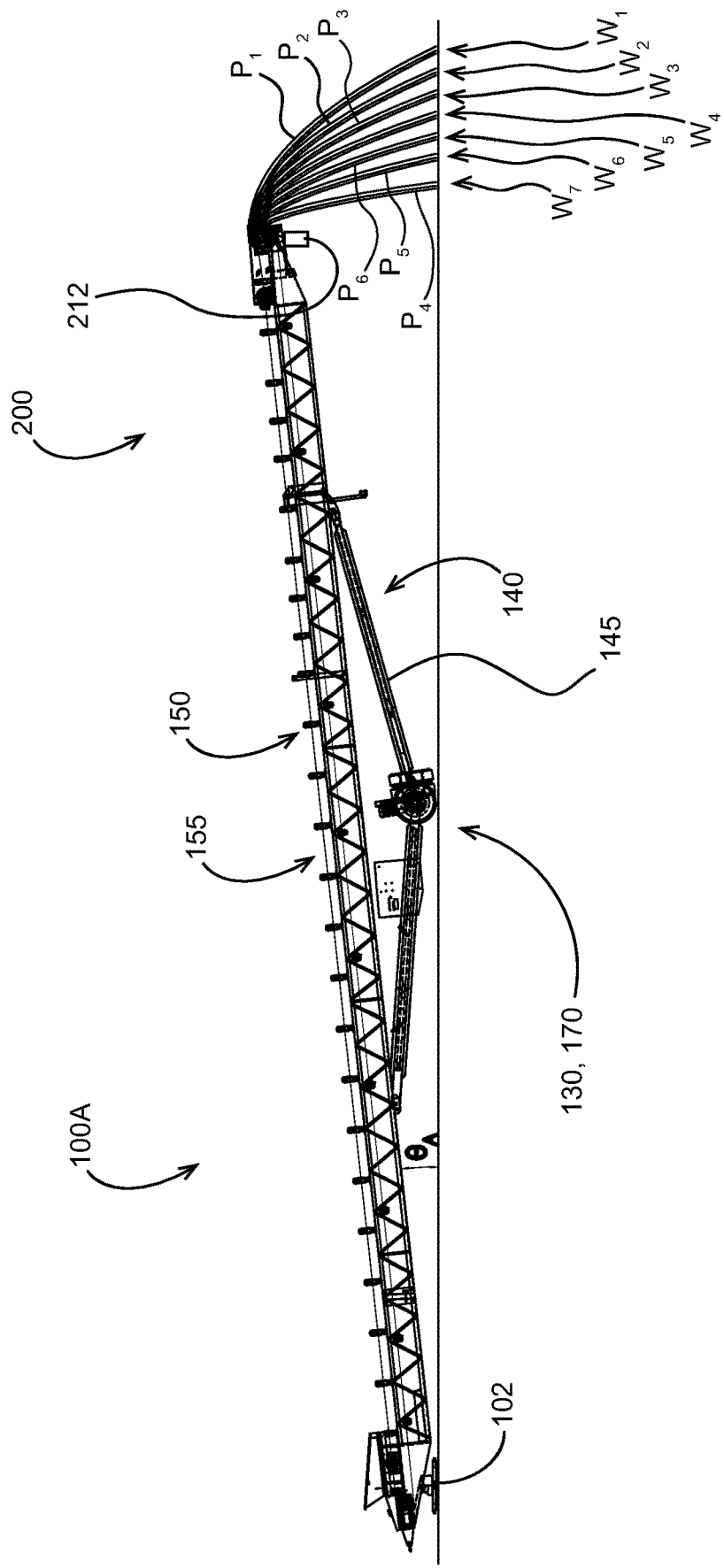
FIG. 2 is a side elevation view of the radial stacking conveyor of FIG. 1 at a first height.

Referring to FIG. 2, a plurality of idler assemblies 150 (e.g., troughing idler assemblies) are optionally disposed along the length of the truss 160. The idler assemblies 150 optionally operably support an endless conveyor belt 155 which optionally extends around the head pulley 106 and tail pulley 104. A support strut 140 optionally supports the truss 160 at a generally forward end and is optionally coupled to an undercarriage 170 (which undercarriage also optionally supports the radial travel wheel assembly 130). The length of support strut 140 optionally determines the height of the truss 160, e.g., a first height 100A shown in FIG. 2 at which the truss 160 is disposed at an angle $\theta_A$ relative to horizontal. In some embodiments, the support strut 140 is telescopic and optionally includes one or more actuators 145 (e.g., hydraulic cylinders) operably coupled to the strut 140 and configured to selectively extend and retract the strut 140 such that the truss 160 is respectively raised (e.g., to the height 100B of angle $\theta_B$ of FIG. 3) and lowered.

Referring again to FIGS. 1 and 2, a control system 200 for controlling the conveyor 100 to create a stockpile S is illustrated schematically. The control system 200 optionally comprises a controller 250 (e.g., having one or more of a graphical user interface, processor, memory in some embodiments) in data communication (e.g., wired, CAN bus, radio, wireless, Internet-based) with one, a plurality of, or all of the components of system 200 described herein and configured to receive data and/or send control signals to such components. The control system 200 optionally comprises the drive 110. The control system 200 optionally comprises one or more valves 220 fluidly coupled to the actuators 145 and configured to selectively extend or retract the actuators 145. The control system 200 optionally comprises one or more drives 240 for driving wheels of the wheel assembly 130 to cause radial travel of the conveyor 100. The drives 240 and/or wheel assembly 130 optionally include or are supplemented by one or more radial travel sensors 260 as described below. The control system 200 optionally comprises a pile sensor 212 (e.g., tilt switch, proximity sensor such as an ultrasonic or radar sensor, etc.) in data communication with controller 250 and configured to generate a signal if the stockpile S is within a threshold vertical distance of the conveyor 100 (e.g., the head end of conveyor 100).

The control system 200 optionally comprises one or more radial travel sensors 260 optionally in data communication with the controller 250. The radial travel sensor 260 may comprise any device and/or system that generates a signal related to the radial position of the conveyor. In some embodiments, the radial travel sensor 260 comprises a Hall effect sensor configured to count revolutions of a shaft, wheel or chain of drive or drives 240. In some embodiments, the radial travel sensor 260 comprises a timer (e.g., timing circuit) configured to measure the driving time of drives 240. In some embodiments, the radial travel sensor 260 comprises a contact sensor (e.g., whisker switch) and/or proximity sensor configured to generate a signal indicating that the conveyor has reached the extent of its radial travel in one of its two radial travel directions (e.g., triggering a command from controller 250 to reverse the radial travel direction of the conveyor or stop radial travel of the conveyor).

The control system 200 optionally comprises a conveyor height sensor 230 optionally in data communication with the controller 250. The conveyor height sensor may comprise any device and/or system that generates a signal related to the height of the conveyor (e.g., the height of the head pulley 106). In some embodiments, the height sensor 230 comprises an inclinometer or other sensor mounted to the conveyor truss and configured to generate a signal indicating the angle of orientation of the truss. In some embodiments, the height sensor 230 comprises a device configured to measure the extension or change in extension of one or more of the actuators 145 (e.g., by directly measuring the extension of an actuator such as by a Hall effect sensor, by measuring the time of extension of an actuator such as by a timer, measuring the amount of hydraulic fluid moving in or out of an actuator during extension or retraction, etc.).

Referring to FIG. 2, in some embodiments the control system 200 is configured to create a plurality of windrows W (e.g., $W_1$ through $W_7$) by selectively changing a speed of the drive 110 such that material deposited from the conveyor 100 travels along a plurality of paths P (e.g., $P_1$ through $P_7$ respectively) having different horizontal distances of travel along the conveyance direction of conveyor 100. In some embodiments, the conveyor executes radial travel at each speed to create a windrow. As an example, drive 110 may operate at a first speed to deposit material along path $P_1$ into a windrow $W_1$ while the conveyor executes radial travel in a first direction, whereupon the drive 110 may operate at a second speed less than the first speed to deposit material along path $P_2$ into windrow $W_2$ while the conveyor executes radial travel in a second direction. The drive speeds are optionally predetermined speeds stored in a memory of controller 250 and selected to create windrows at a specific height of the conveyor; in some embodiments, the drive speeds are correlated to heights of the conveyor and/or extensions of the strut 140 which may be determined using the height sensor 230 or another device or method.

Figure 3:
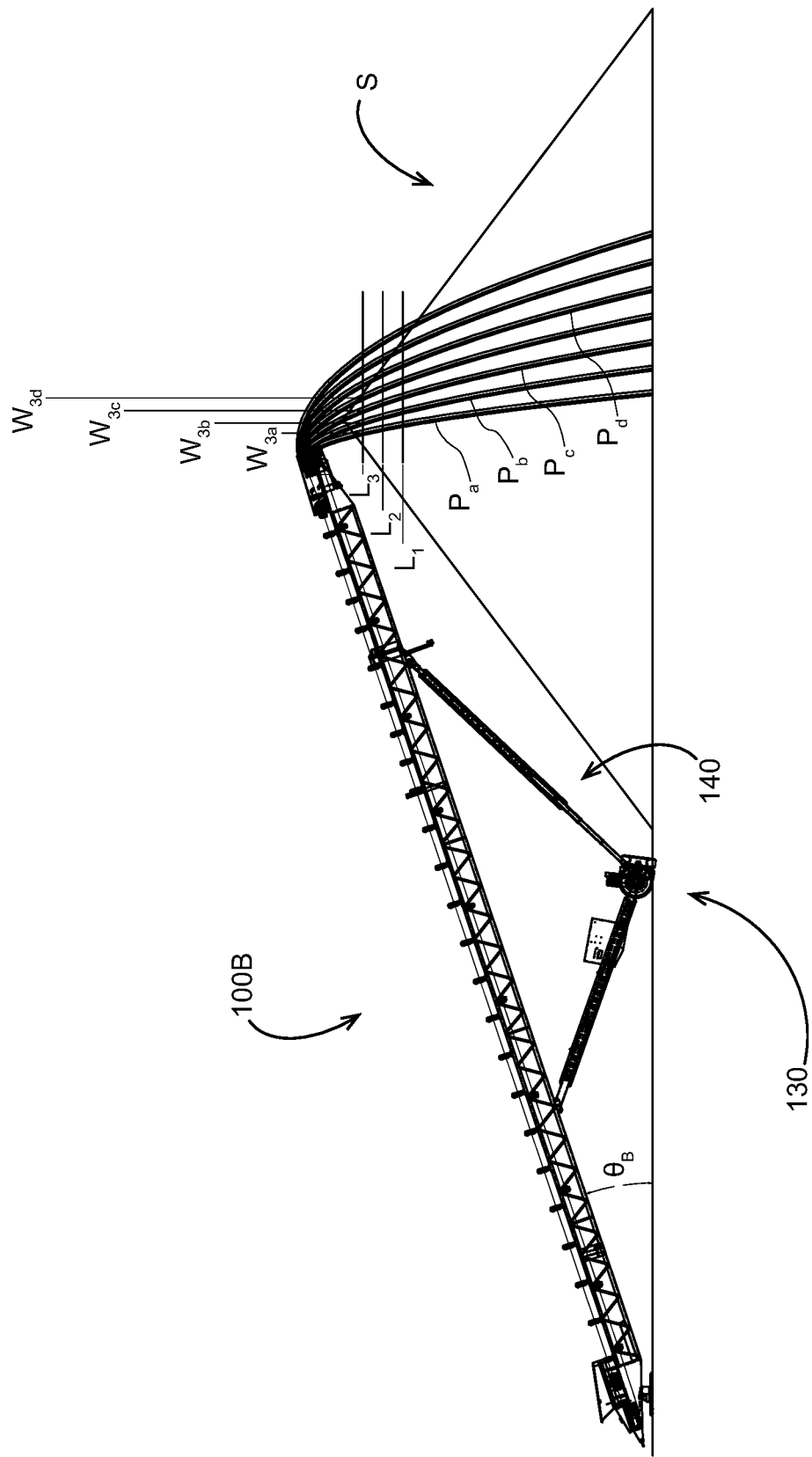
FIG. 3 is a side elevation view of the radial stacking conveyor of FIG. 1 at a second height.

Referring to FIG. 3, in some embodiments the control system 200 is configured to create windrows W in stacked layers L. In some such embodiments this is accomplished by executing the steps of the preceding paragraph and then repeating the steps (e.g., at the same or different drive speeds) to deposit windrows additional on top of the previously deposited windrows. In some embodiments, the maximum and minimum speeds used to create in a second layer are closer together than the maximum and minimum speeds used to create a first layer, such that windrows of the second layer are deposited over a surface that can be at least partially supported by the first layer.

Continuing to refer to FIG. 3, in some embodiments the control system 200 is configured to increase the height of conveyor truss 160 and/or angle θ (e.g., by extending actuators 145 by an increment) when creating successive layers L of windrows W. In some embodiments, the height of conveyor truss 160 is increased in response to a signal from the pile sensor 212 or other sensor.

Figure 4:
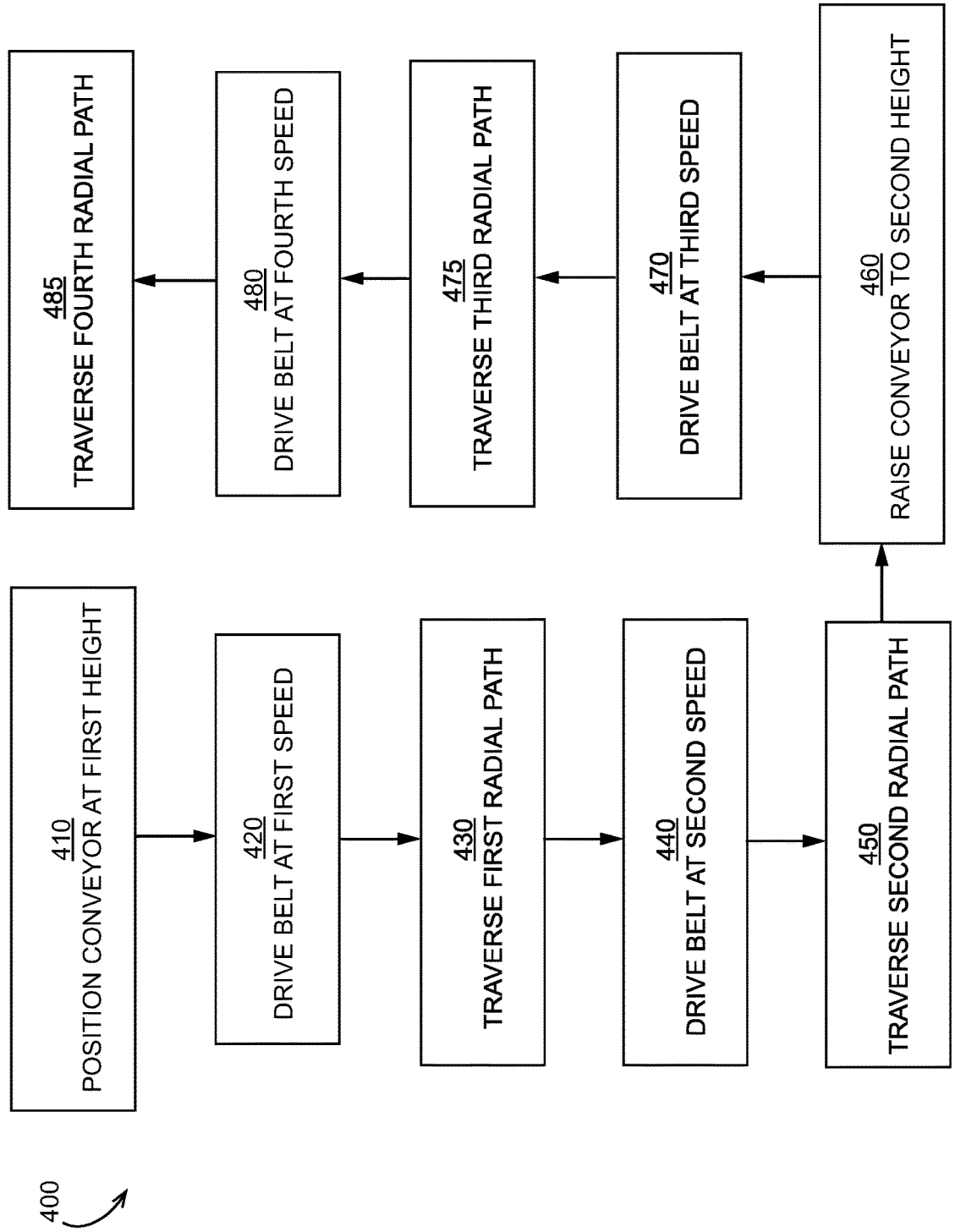
FIG. 4 schematically illustrates an embodiment of a method of forming a stockpile.

Referring to FIG. 4, an exemplary embodiment of a method 400 for creating a stockpile S comprising a plurality of windrows W (e.g., using control system 200 and/or conveyor 100) is illustrated. At step 410 the conveyor 100 is optionally positioned at a desired location with the truss 160 at a first height (in some embodiments, step 410 includes changing the height of the truss 160; in some embodiments step 410 does not include changing the height of the truss 160). At step 420, the belt of conveyor 100 is driven by drive 110 at a first speed. At step 430, the conveyor 100 traverses a first radial path (e.g., along direction R) while the drive 110 continues to operate at the first speed, e.g., such that a first windrow is created. At step 440, the belt of conveyor 100 is driven by drive 110 at a second speed. At step 450, the conveyor 100 traverses a second radial path (e.g., opposite direction R) while the drive 110 continues to operate at the second speed, e.g., such that a second windrow is created. In some embodiments, the absolute radial travel of the first and second radial paths are equal; in other embodiments, the absolute radial travel of the first and second radial paths are different.

In some embodiments, steps 410 through 450 are repeated (e.g., at the same or different speeds or radial travel extents) to create multiple windrows (e.g., in layers) without changing the height of truss 160. In some embodiments, steps 460 through 485 are then carried out as described below. In alternative embodiments steps 460 through 485 are not carried out; e.g., in embodiments in which the strut 140 is of fixed length.

At step 460, the conveyor truss is raised to a second height (e.g., higher than the first height). At step 470, the belt is driven at a third speed (e.g., the same as or different from the first or second speeds). At step 475, the conveyor 100 traverses a third radial path (e.g., the same as or different in extent or direction from the first or second radial paths) while the drive 110 continues to operate at the third speed, e.g., such that a third windrow is created (e.g., on above one or both of the first and second windrows).

At step 480, the belt is driven at a fourth speed (e.g., the same as or different from the first, second, or third speeds). At step 485, the conveyor 100 traverses a fourth radial path (e.g., the same as or different in extent or direction from the first, second, third or fourth radial paths) while the drive 110 continues to operate at the fourth speed, e.g., such that a fourth windrow is created (e.g., on above one or both of the first and second windrows and/or on the same layer L as the third windrow).

Figure 5:
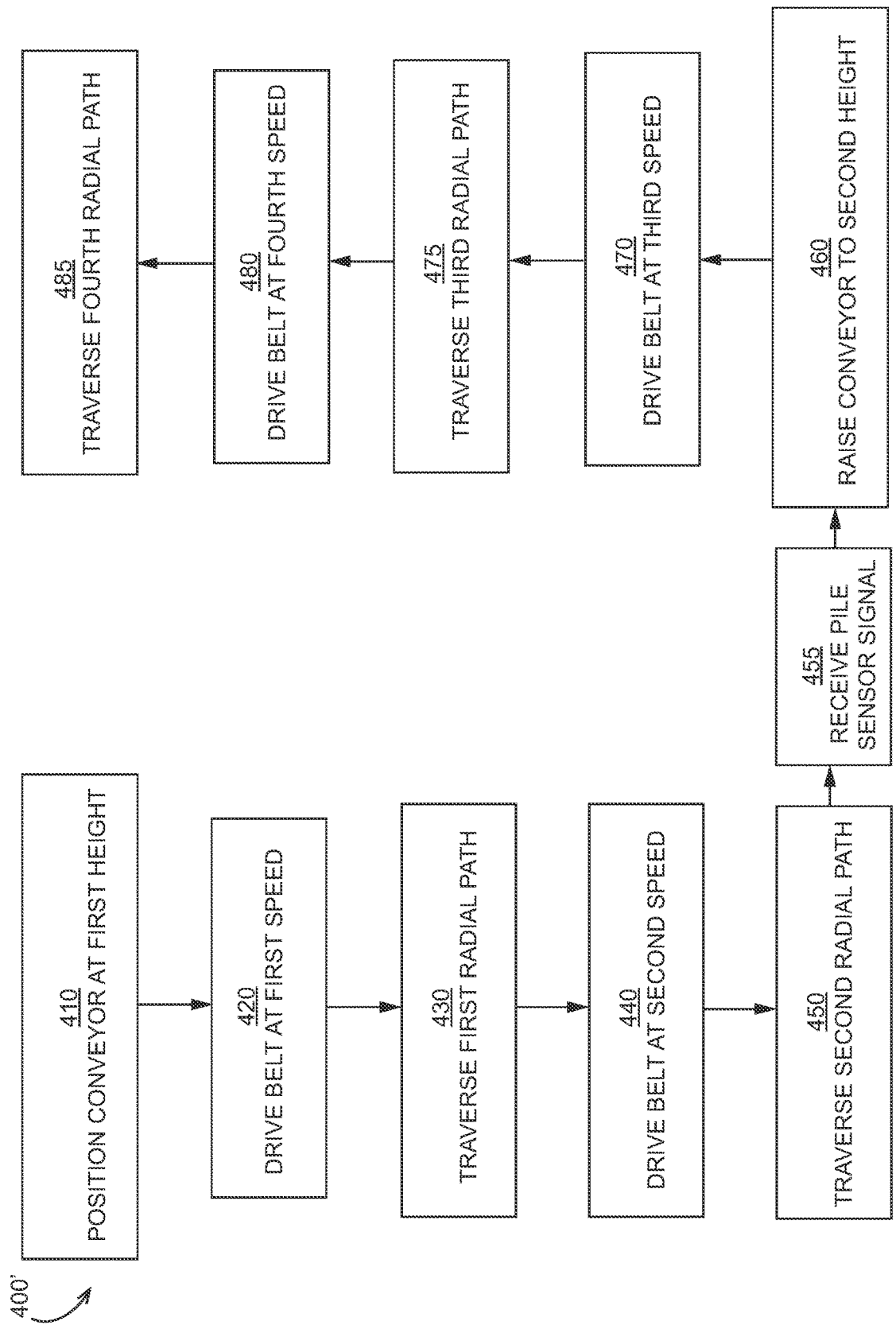
FIG. 5 schematically illustrates another embodiment of a method of forming a stockpile.

Referring to FIG. 5, a modified embodiment of a method 400' for creating a stockpile S is illustrated. Method 400' is generally equivalent to method 400, except that step 460 is optionally not carried out by control system 200 until the pile sensor 212 generates a signal (e.g., threshold signal, tilt signal, contact signal, minimum proximity signal, etc.) at step 455. The pile sensor signal optionally indicates that the pile has reached a minimum distance from the conveyor (e.g., head pulley). In some embodiments, prior to receiving the pile sensor signal at step 455, the control system 200 causes the conveyor to repeat the first and/or second radial paths until the pile sensor 212 generates the signal at 455.

Figure 6:
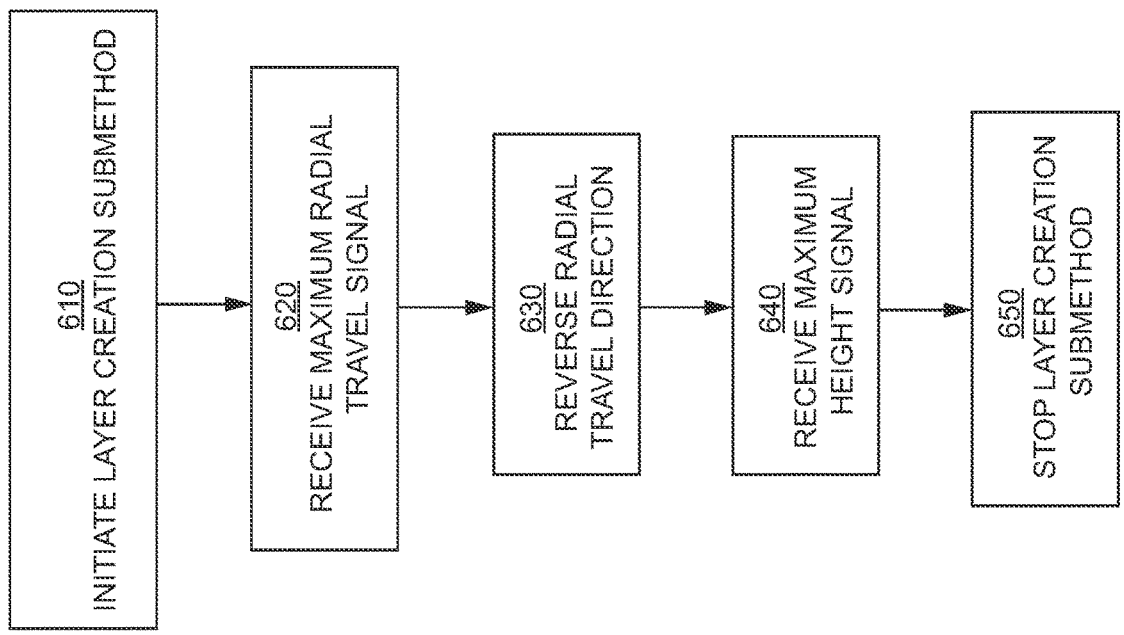
FIG. 6 schematically illustrates another embodiment of a method of forming a stockpile.

Referring to FIG. 6, a method 600 for generating a stockpile S is illustrated including a desegregated layer creation submethod (e.g., including and/or comprising method 400, method 400', etc.). After initiating the layer creation submethod, at step 620 the control system 200 optionally receives a maximum radial travel signal from a radial travel sensor 260 indicating that the conveyor has reached an extreme radial position. At step 630, upon receiving the maximum radial travel signal the control system 200 optionally reverses the radial travel direction of the conveyor (e.g., in order to transition from the first to the second radial path of method 400). At step 640, the control system 200 optionally receives a maximum height signal from the conveyor height sensor 230 indicating that the conveyor has reached a maximum height (which maximum height may be stored in memory of the controller and/or selected by the operator using the controller, etc.). At step 650, upon receiving the conveyor height sensor maximum height signal the control system 200 optionally stops the layer creation submethod (e.g., by stopping the pulley drive, stopping the conveyor belt, stopping the radial travel drive, etc.).

In some embodiments, one or more adjacent windrows W have a greater width than the distance (e.g., as measured from pivot 102) between the adjacent windrows.

In some embodiments, the speed of drive 110 is increased continuously (e.g., at step 440 of method 400) in order to create a material that is longitudinally extending (e.g., along a direction L of the conveyor as shown in FIG. 1 such as the direction $L_R$ when the conveyor is at the rightmost extent of its radial travel or the direction $L_L$ when the conveyor is at the leftmost extent of its radial travel) between adjacent radially extending windrows (e.g., extending along direction R of FIG. 1).

In some embodiments, the control system 200 may build radial conical piles alternatively or additionally to radial windrows. For example, in some embodiments the control system pauses radial travel after small increments while maintaining the same belt speed to create a plurality of conical piles arranged along radial travel direction R.

In some embodiments, the conveyor 100 may include a stinger truss or other means of extending the effective length of the conveyor. In such embodiments, the truss may be extended or retracted (e.g., using a winch or other actuator)

to create successive windrows or other components of stockpile S. In such embodiments, the speed of the belt (e.g., of drive 110) may be varied throughout radial travel and/or between successive radial travels of the conveyor, e.g., to further decrease segregation of the stockpile S.

In some embodiments, the control system 200 includes a belt scale or belt material sensor (e.g., ultrasonic sensor, distance sensor) for determining a presence or amount of material on the belt. In some such embodiments, the stockpile creation methods described herein may be paused if the amount or presence or material on the belt decreases below a minimum threshold.

In some embodiments, the controller 250 creates an internal model (e.g., stored in memory) of the stockpile S as the stockpile is created. The internal model may be used to carry out the method (e.g., continue building the stockpile S) and/or may be communicated to an operator or to other equipment or displays, e.g., for the purpose of selective material removal from stockpile S.

In some embodiments, the windrow type, stockpile type, windrow radial width, and/or stockpile longitudinal extent or other stockpile or windrow characteristics may be selected by an operator such as by using a graphical user interface of the controller 250.

In some embodiments, rather than executing radial travel in order to create a "kidney bean" shaped stockpile S, the conveyor is configured to execute other travel paths such as side-to-side travel in order to create other stockpile shapes such as a generally linear shape.

In some embodiments including but not limited to those described in the preceding paragraph, the conveyor may be supported at least partially on tracks such as during conveying operations.

In some embodiments, the conveyor is incorporated in a mobile, towable or stationary plant which includes one or more other items of aggregate processing equipment (e.g., crushers, vibratory screens, auxiliary conveyors, etc.).

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A conveyor having at least a drive pulley, at least an actuator configured to raise and lower the conveyor, at least a radial travel wheel, comprising:
   a pulley drive operably coupled to the drive pulley;
   at least one valve fluidly coupled to the actuator so as to alternately extend and retract the actuator;
   a radial travel drive operably coupled to the radial travel wheel so as to move the conveyor through a plurality of radial travel paths; and
   a controller in data communication with said pulley drive, said valve, and said radial travel drive, said controller configured to vary a speed of the drive pulley between said radial travel paths in order to at least partially desegregate a stockpile created by the conveyor.

2. The conveyor of claim 1, further comprising:
   a height sensor configured to generate a signal indicating a height of the conveyor.

3. The conveyor of claim 1, further comprising:
   a radial travel sensor configured to generate a signal indicating a radial travel extent of the conveyor.

4. A method of creating a stockpile with a conveyor having a belt driven by a pulley drive, the method comprising:
   positioning the conveyor at a first height;
   driving the belt at a first speed;
   traversing a first radial path with the conveyor while driving the belt at said first speed;
   driving the belt at a second speed;
   traversing a second radial path with the conveyor while driving the belt at said second speed;
   raising the conveyor to a second height;
   driving the belt at a third speed;
   traversing a third radial path with the conveyor while driving the belt at said third speed;
   driving the belt at a fourth speed; and
   traversing a fourth radial path with the conveyor while driving the belt at said fourth speed.

5. A method of creating a stockpile with a conveyor having a belt, the method comprising:
   positioning the conveyor at a first height;
   driving the belt at a first speed;
   traversing a first radial path with the conveyor while driving the belt at said first speed;
   driving the belt at a second speed;
   traversing a second radial path with the conveyor while driving the belt at said second speed;
   receiving a pile sensor signal from a pile sensor;
   upon receiving said pile sensor signal, raising the conveyor to a second height;
   driving the belt at a third speed;
   traversing a third radial path with the conveyor while driving the belt at said third speed;
   determining that the conveyor has reached a maximum radial travel extent;
   reversing a radial travel direction of the conveyor;
   driving the belt at a fourth speed; and
   traversing a fourth radial path with the conveyor while driving the belt at said fourth speed.

6. The method of claim 5, further comprising:
   determining that the conveyor has reached a maximum radial travel extent;
   reversing a radial travel direction of the conveyor.

7. A method of creating a stockpile with a conveyor having a belt driven by a pulley drive, the method comprising:
   positioning the conveyor at a first height;
   driving the belt at a first speed;
   traversing a first radial path with the conveyor while driving the belt at said first speed;
   determining that the conveyor has reached a maximum radial travel extent;
   reversing a radial travel direction of the conveyor;
   driving the belt at a second speed;
   traversing a second radial path with the conveyor while driving the belt at said second speed;
   raising the conveyor to a second height;
   driving the belt at a third speed;
   traversing a third radial path with the conveyor while driving the belt at said third speed;
   determining that the conveyor has reached a maximum radial travel extent;
   reversing a radial travel direction of the conveyor;
   driving the belt at a fourth speed; and
   traversing a fourth radial path with the conveyor while driving the belt at said fourth speed.

8. The method of claim 7, further comprising:
receiving a pile sensor signal from a pile sensor, wherein said step of raising the conveyor to a second height is carried out in response to said pile sensor signal.

9. The method of claim 7, further comprising:
determining that the conveyor has reached a maximum height; and
stopping said conveyor belt.

10. The method of claim 7, further comprising:
receiving a pile sensor signal from a pile sensor, wherein said step of raising the conveyor to a second height is carried out in response to said pile sensor signal.

11. The method of claim 7, further comprising:
determining that the conveyor has reached a maximum height; and
stopping said conveyor belt.

12. The method of claim 7, wherein at least said first radial path comprises an arcuate path.

13. The method of claim 7, wherein at least said first and second radial paths comprise arcuate paths.

14. The method of claim 7, wherein said first through fourth radial paths comprise arcuate paths, wherein the stockpile comprises a kidney bean shaped stockpile.

15. The method of claim 7, further comprising:
creating a first windrow while said first radial path, said first windrow positioned at a first distance from a center of rotation of the conveyor.

16. The method of claim 15, further comprising:
creating a second windrow along said second radial path.

17. The method of claim 16, wherein said first and second windrows comprise a first layer of the stockpile.

18. The method of claim 15, further comprising:
creating a third windrow along said third radial path; and
creating a fourth windrow along said fourth radial path, wherein said third and fourth windrows comprise a second layer of the stockpile.

* * * * *